United States Patent [19]
Christensen

[11] Patent Number: 5,609,238
[45] Date of Patent: Mar. 11, 1997

[54] CONVEYOR SECTION OF MULTI-SECTION CONVEYOR

[76] Inventor: Frantz G. Christensen, 2655 6th Ave. South, St. Petersburg, Fla. 33712-1642

[21] Appl. No.: 583,878

[22] Filed: Jan. 11, 1996

[51] Int. Cl.$^6$ .................................................. B65G 21/06
[52] U.S. Cl. .......................... 198/583; 198/816; 198/860.2
[58] Field of Search .................................... 198/583, 584, 198/816, 860.2, 861.1

[56] References Cited

U.S. PATENT DOCUMENTS

| | | | |
|---|---|---|---|
| 808,122 | 12/1905 | Tanck | 198/816 |
| 2,564,090 | 8/1951 | Ziemann | 198/584 |
| 3,035,685 | 5/1962 | Raynor | 198/816 X |
| 4,925,009 | 5/1990 | Hill | 198/583 |
| 5,096,045 | 3/1992 | Feldl | 198/816 X |

Primary Examiner—James R. Bidwell
Attorney, Agent, or Firm—Kyle W. Rost

[57] ABSTRACT

In a multi-section conveyor, a conveyor section provides a belt tension adjusting mechanism employing extension arms on an expanding tensioner. The extension arms carry the end belt roller and apply increased tension to the belt as the arms extend. The opposed end rollers of adjacent sections are joined to coaxial end gears, and an intermediate idler gear interconnects the end gears when the sections are joined. When sections are assembled, the extension arms mate into the neighboring section and are contoured to permit angular variation in the mating. A latching mechanism on one section locks the end roller of the next section in engagement slots and boxes the gears for safety.

11 Claims, 3 Drawing Sheets

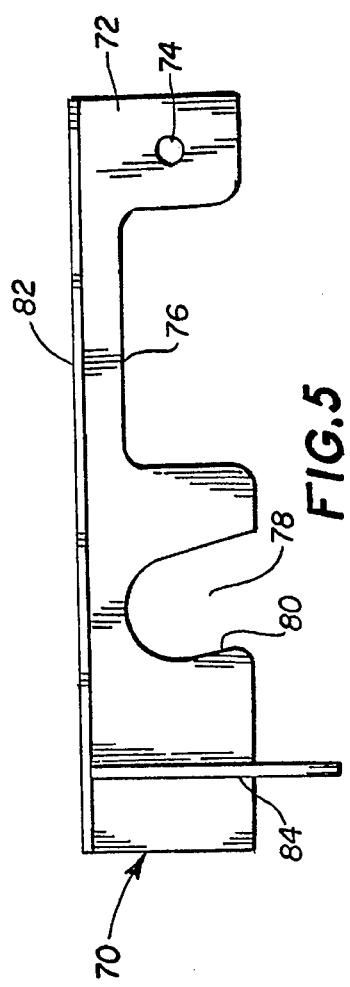
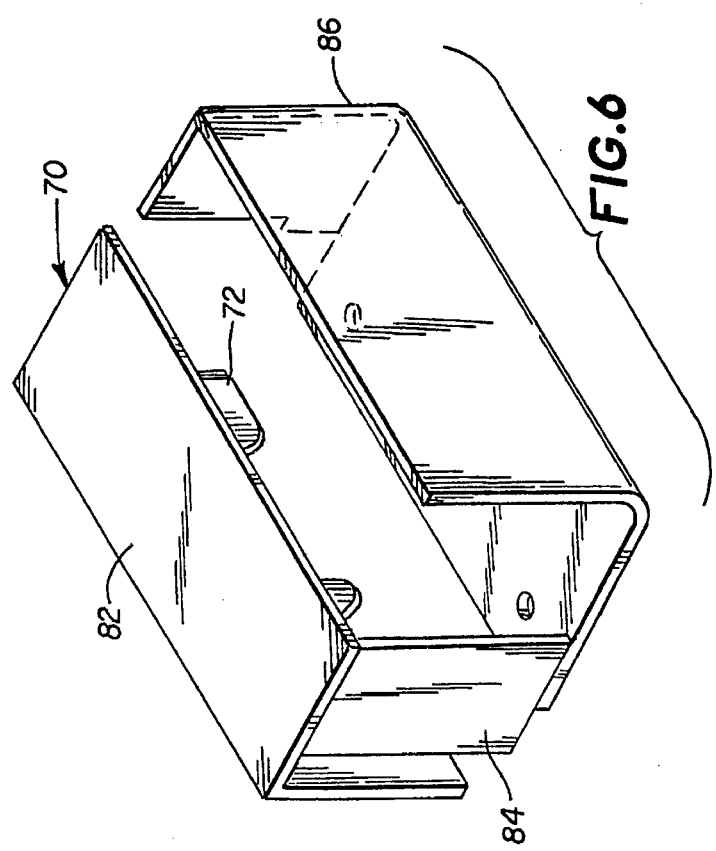

CONVEYOR SECTION OF MULTI-SECTION CONVEYOR

TECHNICAL FIELD

The invention generally relates to power-driven conveyors and a conveying system having plural power-driven conveying sections. More specifically, the invention relates to a conveying system with means connecting the sections for quick assembly or disassembly, especially by means allowing relative movement of joined sections.

BACKGROUND ART

A multi-sectional belt conveyor is constructed of a drive section and a plurality of driven sections, which can be added as required to lengthen the drive section. The location of the end of such a conveyor is changeable by adding or removing a driven section. Thus, this type of conveyor is desirable in applications having a temporary work station or a changeable destination. The drive section is provided with a motor, the weight and size of which causes that section preferably to be stationary or at least moved with difficulty. However, the driven sections can be made relatively much lighter in weight and more portable by deriving their required power from the motor associated with the drive section.

The power of the single motor is transmitted to the driven sections by use of a power transmission system. Many such systems are known, with the most common being the drive shaft systems and the belt drive systems. In the former, an interconnectable drive shaft runs the length of each section for transmitting power, and a power take-off device, such as a right angle drive, allows the drive shaft to independently operate each section of the belt. The drive shaft of each section connects to the drive shafts of the juxtaposed sections, efficiently transmitting power over the length of the assembled sections. In the latter, the conveyor belt itself transmits power over the length of each section and drives a power take-off device, typically a gear system, located at the end of each section. The power take-off device transmits power between the conveyor sections, while the belt transmits power over the length of each individual section. The latter type of transmission system is common, and the present invention is directed to improvements in such a system.

In a belt drive system, three areas present technical problems: the belt tension adjusting system, the power take-off system, and the conveyor section joining or latching system. These can be inter-related in structure and function. The belt tensioning system must provide an efficient translation of motion from the belt itself to the rollers that carry the belt. Typically, at one end of the conveyor section an external source, such as the power take-off from the preceding section, drives a drive roller and, in turn, the drive roller drives the belt. At the opposite end of the section, the belt powers a driven roller, which supplies power to a power take-off system for transmission to the next section. The belt tension is critical to the efficiency of power transmission between the belt and the drive or driven rollers.

The power take-off system must work in cooperation with the drive and driven rollers to transfer power between juxtaposed conveyor sections. The joining system and power take-off system must cooperate, as well, since the joining system establishes the spatial relationship between sections, which must be bridged by the power take-off system. The conditions where portable conveyors are used can increase the difficulties faced by these systems. For example, irregular floors, physical obstructions, and job requirements can lead to uneven or non-linear alignment between sections. Vertical angles, horizontal angles, or combinations of both might result between sections, placing difficult demands on the power take-off and joining systems.

A number of patents have addressed the problems of sectional conveyors powered from a single source. For example, U.S. Pat. No. 5,096,045 to Feldl teaches a conveyor having multiple unit sections that can be joined. The belt tensioning system employs a conventional belt tensioning idler roller on opposite side adjustment bolts, positionable to take up extra belt length along the bottom run. The power transmission system employs belt rollers at opposite ends of the section that drive the conveyor belt, and power is transmitted between sections by gears that interconnect the abutting end belt rollers. The latching system employs a bridge mechanism that carries the power transmission gears in protective boxed end units that are slotted to fit over the ends of the drive rollers. A latch plate locks the boxed end units in engagement with the drive roller spindles. While the systems shown in Feldl accomplish the desired results, there no provision for irregularities in the conveyor environment. For example, the bridge mechanism has no provision for uneven ground or floor surfaces or for lateral bending in the conveyor path. It would be desirable to have greater flexibility in the allowed methods of assembling the sectional conveyor.

U.S. Pat. No. 4,925,009 to Hill teaches a similar sectional conveyor in which the belt tensioning system employs a frame that holds the drive roller relative to a plank that supports the belt along most of its run. Threaded tightening bolts extend the frame with respect to the plank to tension the belt, although it appears the connection between the frame and plank is subject to looseness and misalignment. The power take-off system and joining system are integrated. Drive rollers of adjacent sections are connected by a roller chain that also travels over an idler sprocket carried on the frame's understructure. The chain is given proper tension by separating the sections, and hence the drive rollers, using pre-positioned slots that engage a flange. The integrated systems do not offer flexibility in the position of the adjoining sections.

A somewhat similar system is found in U.S. Pat. No. 2,563,427 to Scott, which shows the interconnection of two conveyor sections in which an end bearing of the two opposed end belt rollers is nested in a common stand. A mating coupler, employing gears connected by a roller chain, joins these two rollers to transmit power from section to section.

Other patents show variations in the construction of multi-sectional conveyors and other equipment. U.S. Pat. No. 4,046,248 to Goffredo et al. shows a system for connecting modules in alignment and transmitting power from a single drive source between the modules. U.S. Pat. No. 4,401,562 to Spugios shows a union between a conveyor unit and a parts separator. Both pieces of equipment are powered through a drive gear in the conveyor unit, which drives the separator via an idler gear. U.S. Pat. No. 1,815,135 to Williams discloses another sectional conveyor that transmits power via idler gears. U.S. Pat. No. 1,603,633 to Nelson shows a sectional conveyor in which sections am joined by hooks and power is transmitted through an idler gear between sections. Finally, U.S. Pat. No. 1,427,890 to Zesbaugh shows a sectional conveyor in which a motor drives an end roller by powering a drive shaft that runs along side the belt.

It would be desirable to have a multi-section conveyor in which the belt tension adjustment was both simple and reliable. Further, the belt tension adjustment should not introduce looseness or misalignment within the individual section.

Further, it would be desirable to have a conveyor section joining system that accommodates irregularities in the path of the assembled sections.

Still further, it would be desirable to have a power transmission system between sections that can accommodate the variations in path direction.

To achieve the foregoing and other objects and in accordance with the purpose of the present invention, as embodied and broadly described herein, the multi-section conveyor of this invention may comprise the following.

DISCLOSURE OF INVENTION

Against the described background, it is therefore a general object of the invention to provide an improved multi-section conveyor in which each section offers an improved belt tensioning system that both maintains the alignment of parts and permits rapid adjustment of belt tension.

A more specific object is to provide a system for joining sections and transmitting power between them, in which variations in direction and irregularities in the conveyor path are accommodated.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a multi-section belt conveyor employs one or more substantially identical conveyor sections. Each section has a continuous conveyor belt. A slider bed defines a longitudinally extending support plate and a pair of opposite, longitudinally extending, channel-shaped, opposite side edge members. The support plate carries the conveyor belt for longitudinal movement along its upper surface. A first of the side edge members defines a first longitudinally extending slot transversely through it near a proximal end of the slider bed. A pair of transversely spaced, longitudinally disposed extension arms each have a proximal end portion and a distal, channel-shaped shank portion. Each shank portion slidably engages the proximal end of an opposite side edge member of the slider bed. A second slot is defined in at least one of the shank portions, in a position where the proximal end of the second slot overlaps the distal end of the first slot. The overlapping portions of the two slots define a common opening. The proximal end portions of the extension arms carry a proximal belt roller on a transverse roller shaft, in a position where the belt roller engages the continuous conveyor belt. The common opening of the two slots carries a belt tensioner, which has opposed first and second pushing blocks that are threadedly connected by a rod. The rod ends are oppositely threaded such that upon rotation in a first direction the pushing blocks are moved relatively apart and upon rotation in the opposite direction the pushing blocks are moved relatively together. Each pushing block defines a longitudinal groove in its outer edge. The groove receives the edges of the first and second slots and retains extension arm in its side edge member. The rod is of sufficient length that, upon rotation in the first direction, it causes the pushing blocks to separate the proximal end of the second slot from the distal end of the first slot. The separation applies tension to the conveyor belt by extending the extension arm with respect to the slider bed.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 5 is a side elevational view of a latch plate.

FIG. 6 is an exploded, isometric view of a gear box cover and latch plate, showing the boxed enclosure they form when the latch plate is closed.

BEST MODE FOR CARRYING OUT THE INVENTION

Figure 1:
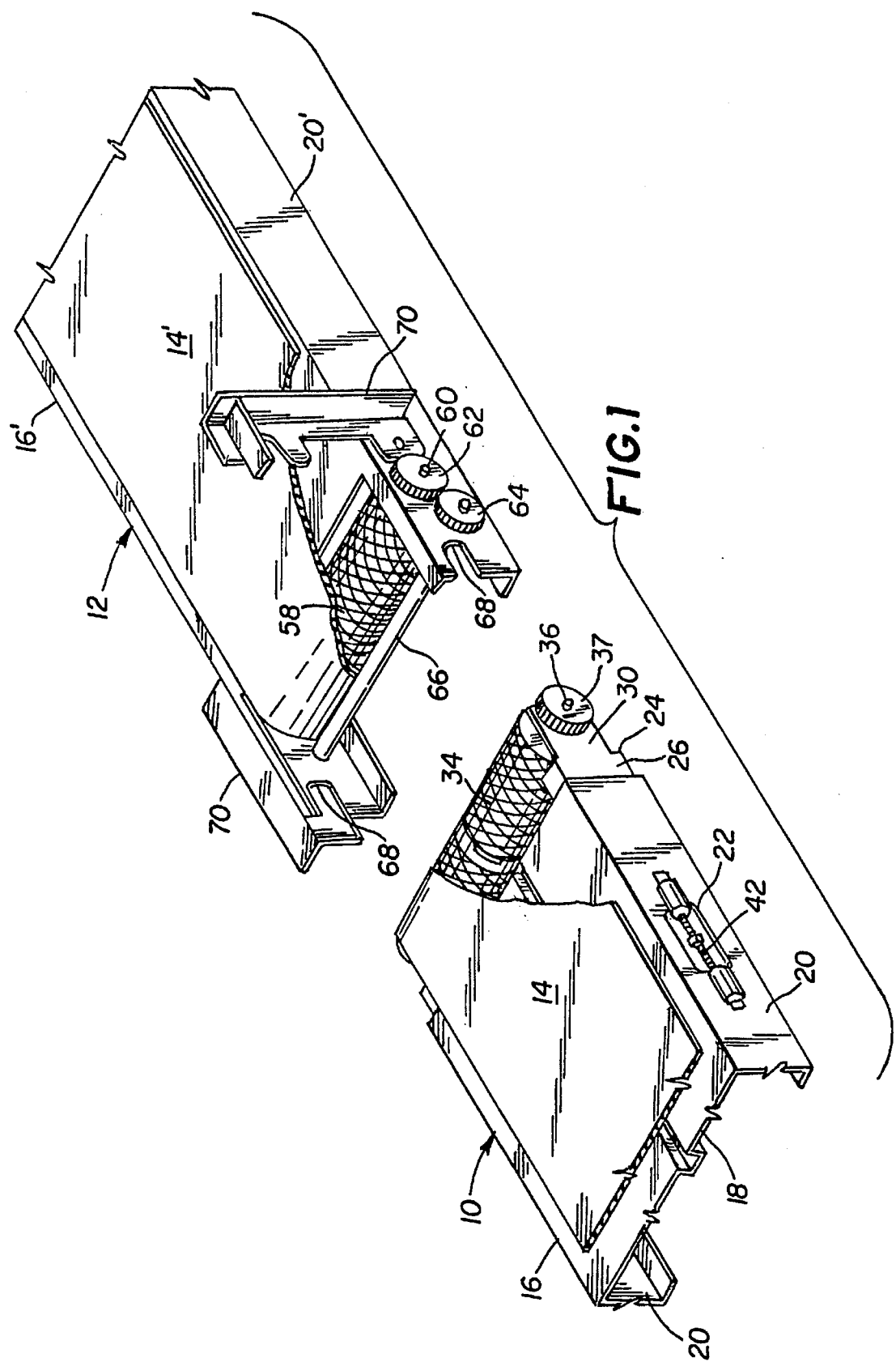
FIG. 1 is an isometric view of the juxtaposed ends of two conveyor sections.

The invention is a multi-section belt conveyor in which plural conveyor sections selectively are added to extend the overall conveyor as required. Power is transmitted from one powered, base section to all others by belt tensioning, power transmission, and latching systems. The individual sections are substantially identical, with the exception that the base section includes a motor that drives an initial belt roller. Many systems are known for powering an initial belt roller from a motor and the specific details of the motor drive system are not a part of this invention. However, even the base section requires a belt tensioning system and a power transmission system for passing motor power to the next, juxtaposed section. Further, the base section, if used as an end section of the conveyor, may require a full latching system in order to connect it to the next, juxtaposed section. If the base section itself does not require a full latching system, it will require at least the mating portions of the latching system for joining to the next, juxtaposed section. In the description that follows, the base, powered section will not be further described, although one such base section is a part of a complete conveyor. Rather, the sections will be described as being a plurality of non-powered sections that are substantially identical to each other.

A first such non-powered section has a slider bed that supports a continuous belt for carrying the load. At one end of the slider bed is a pair of extension arms that carry a moveable, belt tension adjusting roller. The extension arms are channel-shaped and slide in mating channel sides of the slider bed. The position of the extension arms in the slider bed is controlled by a tensioning means using reverse turnbuckle action to extend the arms, thereby pushing the moveable roller to apply tension to the belt, ensuring that the belt can impart rotation to the moveable roller. In addition, the tensioning means retains the extension arms in the sides of the slider bed.

The tensioner consists of two pushing blocks mounted on oppositely threaded ends of a rod. Rotating the rod one way spreads the pushing blocks, pushing out the extension arms and, hence, the moveable roller. The ends of the moveable roller shaft, outside the extension arms, carry a bearing and gear that mate with a second, substantially identical conveyor section.

The mating end of the second, juxtaposed slider bed carries a fixed belt roller, recessed from the end of the slider bed, and with a gear system extending from the ends of the roller shaft. The sides of the slider bed protrude longitudinally from the fixed roller position and are horizontally slotted to receive the bearings on the ends of the first section's moveable roller shaft. A pivoted latch means clips over the bearing with an approximately vertical slot and boxes the gear system, locking the bearing into the fixed end of the second section's slider bed with the moveable gear engaging the fixed gear system to drive the fixed roller. The slot in the latch is cut a few degrees past vertical to achieve a hook type of engagement, such that any pulling between juxtaposed sections pulls down the latch more tightly.

Further, the ends of the extender arms have a rounded upper contour with substantial lower clearance with respect to the mating ends of the second slider bed to allow substantial vertical deflection between sections. This allows the assembled conveyor sections to be laid out over a somewhat irregular ground surface, while still transmitting power between sections.

With reference to FIG. 1 of the drawings, two abutting ends of first and second juxtaposed sections of a multi-section belt conveyor are shown. The first conveyor section 10 is shown on the left side of FIG. 1, while the second conveyor section 12 is shown on the right. Of course, each individual section includes both such ends. However, the interconnection and interaction of two juxtaposed sections is best understood from an explanation of the two ends as belonging to the separate conveyor sections. The illustrated end of section 10 will be referred to in relative terms as the proximal end of the conveyor. The opposite end will be referred to as the distal end. Correspondingly, the end of conveyor section 12 illustrated on the right hand side of FIG. 1 also will be referred to as a distal end.

The first conveyor section 10 is provided with a continuous conveyor belt 14 of conventional construction and a suitable supporting bed. The main body of conveyor section 10 is a slider bed 16 that defines a longitudinally extending, substantially horizontal support plate 18 and longitudinally extending, channel-shaped, opposite side edge members 20. The entire slider bed may be formed from a single sheet of planar material, suitably bent, formed, cast, or extruded into the configuration of the support plate and channel-shaped sides. The support plate 18 carries the conveyor belt on its upper surface for longitudinal movement over the majority of the length of the conveyor section. Conventional conveyor belts may have one or more longitudinal ribs on their bottom surfaces, which mate with grooves in the slider bed and prevent the belt from travelling laterally. The slider bed may be configured to have such grooves in its support plate 18 in order to accommodate such a belt.

Figure 2:
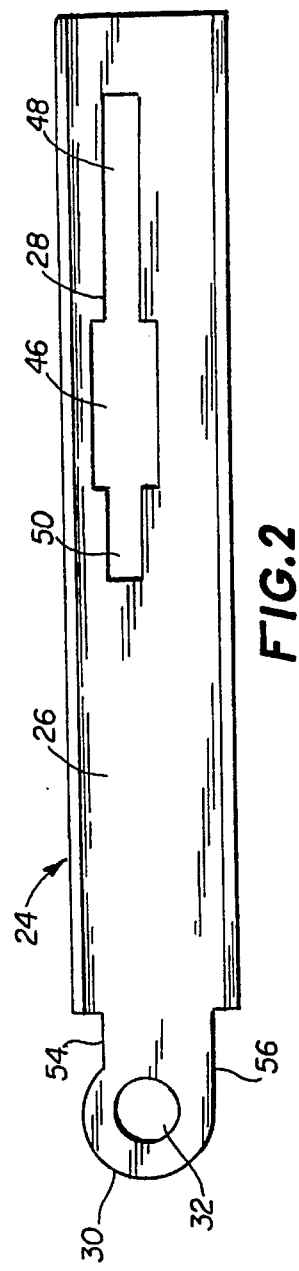
FIG. 2 is a side elevational view of a right side extension arm, the left side extension arm being a mirror image thereof.

The channel-shaped sides of the slider bed strengthen the bed and carry a mechanism for tensioning the belt. The tensioning mechanism employs semi-overlapping slots in the sides and in extension arms, allowing an extendable mechanism carried in the slots to move the extension arms with respect to the sides. One and preferably both of the channel-shaped side edge members 20 define a longitudinally extending slot 22 therethrough near one end of the conveyor section, in this example near the proximal end. Each of the channel-shaped sides 20 carries a longitudinally disposed extension arm 24, which is engaged in the proximal end of the side, such that a portion of the extension arm overlaps the location of the slot 22. In FIG. 2 one of the extension arms is shown in greater detail. The near side of the conveyor section 10, as shown in FIG. 1, is termed the right side, while the far side is the left. FIG. 2 shows the right side extension arm as viewed from the center of the conveyor bed, while the left side is a mirror image. Each extension arm has a distal end configured as a channel-shaped shank portion 26. Each shank portion is slidably received in an opposite one of the sides 20. The shank portions are sized to fit closely within the side channels 20, but with adequate clearance to permit longitudinal sliding movement. At least one shank portion, and preferably both, define a second slot 28 therethrough, that is positioned to be at least semi-overlapping with a slot 22. The slot in the shank 26 is similar in size and vertical position to the slot 22 in the side 20, so that slot 28 and slot 22 are capable of at least partial longitudinal overlap with substantially identical vertical alignment when a shank 26 is housed in a side channel 20. In addition, slot 28 is located in a longitudinal position on shank 26 such that, when the extension arm is in its longitudinal useful, operable range of positions in the conveyor section, the proximal end of slot 28 is longitudinally overlapping the distal end of slot 22, defining a common opening through portions of both slots.

Each extension arm also defines a proximal end portion 30, which defines a means for carrying a belt roller, such as the roller carrying opening 32. A proximal belt roller, such as moveable roller 34, FIG. 1, is carried on a transverse roller shaft 36 engaged in the opening 32. The roller shaft 36 is preferred to define a bearing surface suitably positioned to be engaged in opening 32. The bearing surface could be, for example, a roller bearing that is wider than the thickness of the extension arm, or it could be a portion of the roller shaft, itself. Thus, bearing surface provides a contact area wider than the extension arm, suited for engagement with a connector to the next conveyor section 12. The roller shaft also carries gears 37 mounted for rotation with the shaft and roller 34. The extension arms can be suitably positioned with respect to the slider bed 16 to hold roller 34 in engagement with the continuous conveyor belt 14. The extension arms are adjustable in position with respect to the slider bed to maintain belt tension against roller 34.

Figure 3:
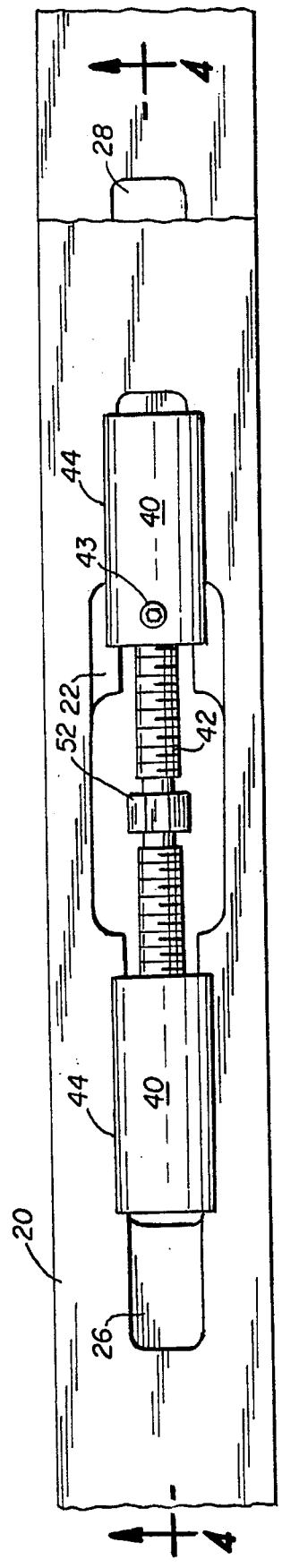
FIG. 3 is a broken-away, side elevational view of a tension adjuster, engaged in an extension arm and slider bed of a conveyor section.
Figure 4:
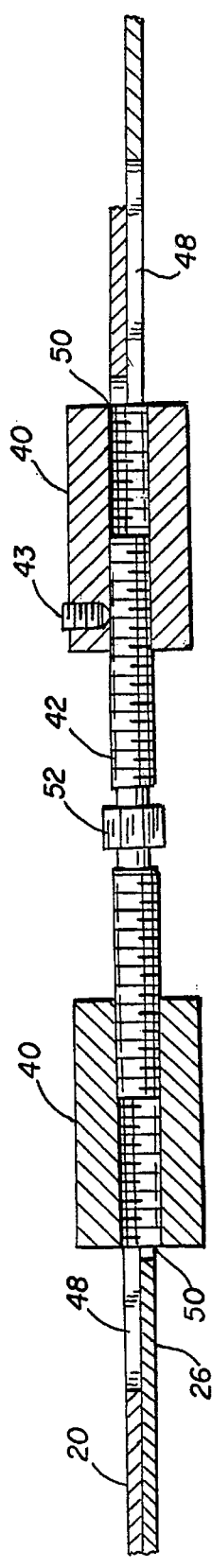
FIG. 4 is a cross-sectional view taken along the plane of line 4—4 of FIG. 3, showing the internal structure of the tension adjuster and its engagement with the slider bed and extension arm.

A belt tension adjuster 38 is carried in the opening created by the overlapping portions of the slots 22 and 28 for the purpose of suitably adjusting the position of the extension arms. Details of the tension adjuster are best shown in FIGS. 3 and 4. The adjuster is composed of opposed first and second pushing blocks 40, which are threadedly connected by a rod 42. The opposite halves of the rod are threaded in opposite directions, such that when the rod is rotated in a first direction the pushing blocks 40 are moved relatively apart, and when the rod is rotated in the opposite direction the pushing blocks are moved relatively together. The operation is similar to that of a turnbuckle, but in reverse, since in its operative mode to place the belt in tension, the adjuster is spread instead of contracted. At least one of the blocks is provided with a set screw 43, of the type having a soft tip, such as of nylon or other plastic. The set screw prevents the adjuster from backing-off its setting due to conveyor vibrations.

When the rod is turned to separate the pushing blocks, the blocks push against the proximal end of slot 28 and the distal end of slot 22, which moves the extension arms 24 in the proximal direction with respect to the slider bed. The extension arms carry with them the roller 34, which places the belt 14 in tension and ensures that the belt has adequate frictional contact with the roller. Thus, the belt and roller move together, transmitting power from one to the other, preferably with little if any slippage and power loss between them.

The pushing blocks 40 not only tension the belt, but they also hold together the extension arms in the side channels of the slider bed. Each pushing block has a longitudinal groove 44 in its outer edge, preferably on both the top and bottom edges of the block. Each groove receives the edges of the extension arm and side channel that define the edges of the slots 22 and 28, as shown in FIG. 3. The grooves 44 retain together the walls of the side channel extension arm, so that only longitudinal movement between the walls is possible. In addition, the engagement between the grooves and the edges of the slots carry and guide the pushing blocks so that the blocks cannot be misaligned in the slots.

As shown in detail in FIG. 2, the preferred configuration of slots 22 and 28 is a cruciform shape. Along a generally vertical axis is a central, vertically elongated slot arm portion 46. Along a generally horizontal axis is a longitudinal slot extending from both sides of the vertical arm 46. One arm of the longitudinal slot is a relatively longer slot arm 48, which extends distally from the central portion of slot 28 in the extension arm 24, and extends proximally from the central portion of slot 22 in the side channel of the slider bed. A relatively shorter longitudinal slot arm 50 extends from the opposite edge of the central portion in both slots. Thus, the shorter slot arm 50 extends distally on the slider bed and proximally on the extension arm. The central slot portion 46 is of a suitable size to receive an individual pushing block and serves as a point to install or remove the pushing blocks. In addition, the central arm 46 allows access for fingers or for use of a wrench on rod 42.

The cruciform slots 22 and 28 are substantially identical mirror images of each other: the longer slot arms 48 and the shorter slot arms 50 are reversed in relative directions. The length of the short slot arm 50 is preferred to be similar to or shorter than the length of a pushing block, as shown in FIGS. 3 and 4. The short slot arm 50 serves to secure the pushing block in a relatively fixed position, in which the pushing block is backed against the end of the short slot arm 50. The length of the longer slot arm 48 is preferred to be a multiple of the length of a pushing block, such as twice as long, and must be long enough to permit the slot 28 and the extension arm to be moved into a longitudinally offset position, as may be required to tension the conveyor belt. The excess length of the longer slot arm, over the length of a pushing block, is approximately the amount of adjustment that is available.

Consequently, as shown in FIG. 3, in one of the slots, such as slot 22, a first pushing block 40, as shown on the right side of FIG. 3, will be backed against the end wall of short slot arm, while the second pushing block 40, as shown on the left side of FIG. 3, is moveable in the longer slot arm. With respect to the mirror image slot 28 of the extension arm, the same first pushing block, shown on the right, is moveable in the longer slot arm, while the same second pushing block, on the left, is backed against the end wall of the shorter slot arm. As best shown in FIG. 4, the groove in the first, right hand pushing block carries the edges of the shorter slot arm of slot 22 and of the longer slot arm of slot 28; and the groove of the second, left hand pushing block carries the edges of the shorter slot arm of slot 28 and the longer slot arm of slot 22.

When the rod 42 is rotated in the direction to separate the pushing blocks, the pushing blocks extend the extension arms with respect to the slider bed by pushing the first block against the end of the shorter slot in the slider bed and by pushing the second block against the end of the shorter slot in the extension arms. According to the preferred rod construction, near its midpoint the rod carries a means for turning the rod with a driving tool. For example, the rod may carry a hexagonal knob 52 between the oppositely threaded ends. This knob is readily engaged and turned by an open end wrench or plier.

The central vertically enlarged portion 46 of each slot provides clearance for the tool to engage the knob. It is desirable that the knob always remain in the overlapping portions of both of the vertical enlargements 46 of slots 22 and 28. Consequently, the relative longitudinal lengths of the shorter slots, the pushing blocks, the rod, and the central areas 46 is such that the knob is maintained within the central portions 46 of the two slots throughout engagement of the rod with the pushing blocks. The described symmetry of the rod, the identical construction of the pushing blocks, and the mirror image construction of the slots is one scheme that assures that the knob will remain individual central area 46 of each slot 22 and 28, as well as in the overlap of these central areas 46 as extension arms are extended with respect to the slider bed.

The proximal end 30 of each extension arm is configured to be engaged in the distal end of the slider bed 16' of the next conveyor section. Specifically, the proximal end 30 is received in the distal end of a side channel 20'. In order to accommodate irregularities in the conveyor path, the proximal end is engageable in the side channel over a variation of about 20° in vertical angle. To achieve this ability, the proximal end is rounded along its top surface, as shown in FIG. 2. The roller carrying aperture 32 is defined above the center line of the extension arm and asymmetrically nearer the top of the rounded portion of the proximal end. The rounding of the top edge continues distally of aperture 32 until it creates a notch 54 in the top of the proximal end, between aperture 32 and shank portion 26. In addition, the lower edge 56 of the proximal end is recessed from the vertical thickness of the shank portion. The side channels 20' of the next conveyor section 12, FIG. 1, are sized to receive the shank portion of a slider arm. Consequently, the rounded top, notch, and recessed lower edge provide clearances that enable the extension arm to engage the side channel of the next conveyor section 12 over a range of vertical angles.

With reference to FIG. 1, the distal end of conveyor section 12 is shown. This end is identical to the distal end of conveyor section 10, so similar parts are assigned the numbers previously used, primed. Section 12 carries a distal belt roller 58 on a transverse shaft 60, located near the distal end of slider bed 16' and engaging conveyor belt 14'. The shaft is preferred to be mounted on a bearing. A distal roller gear 62 is connected to shaft 60 for rotation with the roller and shaft. In addition, an idler gear 64 is carried on an idler shaft 66, also carried by bearings in side channels 20' of the slider bed. The idler gear engages roller gear 62 and rotates with it.

The conveyor sections 10 and 12 can be engaged to transmit power from one to the other, in either direction. The side channels 20' define generally horizontal receiving slots 68 that engage conveyor section 10, receiving the roller shaft 36, preferably by co-engaging bearings that support shaft 36 in side edges 20. The slots 68 are positioned such that roller gears 37 of conveyor section 10 engage idler gears 64 of conveyor section 12. Thus, the powered rotation of either roller 34 or roller 58 will be transmitted between the conveyor sections to the other roller through gear trains 37, 64, and 62, preferably on both sides of the conveyor sections.

The engaged conveyor sections are latched together to prevent accidental separation and to guard the gear trains. A means for latching the conveyor sections together attaches the distal end of conveyor section 12 to the proximal end of conveyor section 10. For example, a latch housing 70, FIGS. 1, 5, and 6, is pivotally connected to slider bed 16' and is pivotally moveable between open and latched positions. The open position as shown at the near side of FIG. 1, while the closed position is shown at the far side of FIG. 1. When the latch housing 70 is open, it allows access to the gear train and slots 68. From open position, the latch housing is pivotable to a closed position covering roller gear 62 and idler gear 64 of conveyor section 12. In addition, when the conveyor sections 10 and 12 are engaged, the latch housing also covers roller gear 37 of conveyor section 10.

Further details of latch housing 70 are shown in FIG. 5. A backing plate 72 defines a pivot mounting hole 74 that permits the housing to be mounted to a slider bed. A gear train recess 76 provides clearance for the backing plate to be lowered over the gears 62 and 64, spanning the distance between their respective shafts. The backing plate next defines a slot 78 that is angled by a few degrees from the vertical, when viewed in latched configuration, for engaging roller shaft 36. Slot 78 is preferred to be angled distally at about 10° from vertical, so that it achieves a small degree of hooking action when engaged over shaft 36. Longitudinal forces otherwise tending to pull apart the conveyor sections will pull down the latch housing due to the hooking action, thus preventing the latch housing from slipping out of latching engagement. When the latch is closed, the slot 78 crosses the slot 68, and the distal edge 80 of slot 78 closes the slot 68, locking the roller shaft 36 in the combined slots 68 and 78. The latch housing 70 also provides a top plate 82 that covers the top of the gear train, and an end plate 84 covering the distal end of the gear train.

An additional gear box cover 86, FIG. 6, completes the boxed covering of the gear train. Cover 86 closes three sides of the gear train—the bottom, an end opposite end plate 84, and the outer side. The bottom wall is extended under the side of the slider bed for attachment. The gear box cover has been omitted from FIG. 1 for clarity. However, FIG. 6 clearly shows the relationship between the cover 86 and latch housing 70. When the latch housing and gear box cover are closed, the gear train is entirely protected and the conveyor sections are locked together.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. For use in a multi-section belt conveyor, the conveyor section comprising:

a continuous conveyor belt;

a slider bed defining a longitudinally extending support plate and longitudinally extending, channel-shaped, opposite side edge members, wherein said support plate carries said conveyor belt for longitudinal movement along an upper surface thereof, and at least a first of said side edge members defines a first longitudinally extending slot therethrough near a proximal end of the slider bed;

a pair of transversely spaced, longitudinally disposed extension arms each having a proximal end portion and a distal, channel-shaped shank portion, each shank portion slidably engaging an opposite side edge member of the slider bed at a proximal end thereof, wherein at least said shank portion engaging the first side edge member defines a second slot therethrough, the proximal end of the second slot overlapping the distal end of the first slot, defining an overlapping portion of the first and second slots;

a proximal belt roller carried on a transverse roller shaft by the proximal end portions of the extension arms and engaging said continuous conveyor belt;

a belt tensioner carried in said overlapping portion of the first and second slots, having opposed first and second pushing blocks threadedly connected by a rod having oppositely threaded ends such that upon rotation in a first direction the pushing blocks are moved relatively apart and upon rotation in the opposite direction the pushing blocks are moved relatively together;

wherein each pushing block defines a longitudinal groove in its outer edge and receives in said groove the edges of the first and second slots, retaining together the first side edge member of the slider bed and its extension arm; and wherein said rod is of sufficient length that, upon rotation in the first direction, it applies tension to the conveyor belt by causing the pushing blocks to extend the extension arm with respect to the slider bed by separating the proximal end of the second slot from the distal end of the first slot.

2. The conveyor section of claim 1, wherein:

said first slot comprises a first cruciform aperture having a first central, vertically enlarged portion, a first, relatively longer longitudinal slot extending proximally from the first central portion, and a first, relatively shorter longitudinal slot extending distally from the first central portion;

said second slot comprises a second cruciform aperture having a second central, vertically enlarged portion, a second, relatively longer longitudinal slot extending distally from the second central portion, and a second, relatively shorter longitudinal slot extending proximally from the second central portion;

wherein the first pushing block receives in said groove the edges of the first shorter slot and second longer slot, and the second pushing block receives in said groove the edges of the second shorter slot and the first longer slot; and wherein said rod causes the pushing blocks to extend the extension arms with respect to the slider bed by causing the first block to push upon the end of the first shorter slot and the second block to push upon the end of the second shorter slot.

3. The conveyor section of claim 2, wherein:

substantially at the midpoint between the oppositely threaded ends of said rod, the rod comprises a rod turning means for engaging a driving tool; and the relative lengths of the first shorter slot, the first pushing block, the rod, and the first central vertically enlarged portion of the first slot is such that said rod turning means is maintained within the first central vertically enlarged portion of the slot during engagement of the rod with the first pushing block.

4. The conveyor section of claim 3, wherein:

said first and second cruciform apertures are configured in substantially identical mirror image configurations of each other; and the relative lengths of the second shorter slot, the second pushing block, the rod, and the second central vertically enlarged portion of the second slot is such that said rod turning means is maintained within the second central vertically enlarged portion of the slot during engagement of the rod with the second pushing block.

5. The conveyor section of claim 1, wherein said proximal end portion of each of said extension arms comprises:

a roller carrying means;

an upper edge defining a notch between said roller carrying means and said shank portion; and a lower edge recessed with respect to the vertical thickness of the shank portion; and wherein:

the distal end of said slider bed comprises channel-shaped opposite side edge members having a channel height sufficient to receive a shank portion longitudinally therein.

6. The conveyor section of claim 1, connectable, in use, to a like conveyor section, further comprising:

a distal belt roller carried on a transverse shaft near the distal end of said slider bed and engaging said conveyor belt;

a distal roller gear connected to said distal belt roller for rotation therewith;

an idler gear carried by the slider bed, engaging said distal roller gear for rotation therewith; and a proximal roller gear connected to said proximal belt roller for rotation therewith;

wherein:

the distal end of said side edge members define receiving slot means for engaging, in use, the proximal end of a like conveyor section; and said idler gear is positioned with respect to said receiving slot means for engaging, in use, the proximal roller gear of a like conveyor section engaged in the receiving slot means;

a latch housing means for latching the distal end of the conveyor section, in use, to the proximal end of a like conveyor section, wherein the latch housing means is pivotally connected to said slider bed and pivotable to a position covering said distal roller gear, idler gear, and, in use, proximal roller gear of a like conveyor section engaged in the receiving slot means; and wherein said latch housing defines a slot of hooked configuration engageable, in use, over the proximal roller shaft of a like conveyor section engaged in the receiving slot means.

7. The conveyor section of claim 1, further comprising:

a friction locking means for selectively preventing relative rotation between said pushing blocks and said rod.

8. The conveyor section of claim 7, wherein said friction locking means comprises a set screw carried in one of said pushing blocks and selectively engageable against said rod.

9. The conveyor section of claim 8, wherein said set screw comprises a soft nose.

10. In a multi-section belt conveyor, the conveyor section comprising:

a continuous conveyor belt;

a slider bed defining a longitudinally extending support plate and longitudinally extending, channel-shaped, opposite side edge members, wherein said support plate carries said conveyor belt for longitudinal movement along an upper surface thereof;

a pair of transversely spaced, longitudinally disposed extension arms each having a proximal end portion and a distal, channel-shaped shank portion; wherein:

each said shank potion of the extension arms slidably engages an opposite side edge member of the slider bed at a proximal end thereof;

the distal end of the slider bed comprises channel-shaped opposite side edge members having a channel height sufficient to receive the shank potion of an extension arm longitudinally therein;

each said proximal end portion of the extension arms comprises a roller carrying means;

the upper edge of the proximal end portion defines a notch between said roller carrying means and said shank portion; and the lower edge of the proximal end portion is recessed with respect to the vertical thickness of the shank portion, such that the proximal end portion has vertical pivotal freedom when engaged, in use, in the side edge members of the distal end of a like conveyor section;

a proximal belt roller carried on a transverse roller shaft, engaged by said roller carrying means and engaging said continuous conveyor belt; and a means for applying tension to the conveyor belt by extending extension arms with respect to the slider bed.

11. The conveyor section of claim 10, further comprising:

a distal belt roller carried on a transverse shaft near the distal end of said slider bed and engaging said conveyor belt;

a distal roller gear connected to said distal belt roller for rotation therewith;

an idler gear carried by the slider bed, engaging said distal roller gear for rotation therewith; and a proximal roller gear connected to said proximal belt roller for rotation therewith;

wherein the distal end of said side edge members define receiving slots engageable, in use, with the proximal end of a like conveyor section, in a position such that the proximal gear of the like conveyor section engages said idler gear; and a latch housing means for latching the distal end of the conveyor section, in use, to the proximal end of a like conveyor section, wherein the latch housing means is pivotally connected to said slider bed and is pivotable about said connection to a position covering the distal roller gear and idler gear and, in use when the conveyor section is connected to a like conveyor section, covering the proximal roller gear of the like conveyor section;

wherein said latch housing defines a slot of hooked configuration engageable, in use, over the proximal roller shaft of a like conveyor section.

\* \* \* \* \*